United States Patent [19]
Wilfert

[11] 3,817,553
[45] June 18, 1974

[54] SHOCK-ABSORBING FRONT-WALL FOR MOTOR VEHICLES

[75] Inventor: Karl Wilfert, Gerlingen-Waldstadt, Germany

[73] Assignee: Daimler-Benz Aktiengesellschaft, Stuttgart-Unterturkheim, Germany

[22] Filed: Dec. 15, 1971

[21] Appl. No.: 208,315

[30] Foreign Application Priority Data
- Dec. 15, 1970 Germany............................ 2061595
- Dec. 23, 1970 Germany............................ 2063478

[52] U.S. Cl. ............................... 280/150 B, 180/90
[51] Int. Cl. ............................................ B60r 21/04
[58] Field of Search ..................... 180/90; 280/150 B

[56] References Cited
UNITED STATES PATENTS

| | | | |
|---|---|---|---|
| 2,827,305 | 3/1958 | Graham............................ | 280/150 B |
| 2,833,554 | 5/1958 | Ricordi............................. | 280/150 B |
| 3,088,539 | 5/1963 | Mathues et al. ................. | 180/90 |
| 3,439,769 | 4/1969 | Brilmyer...................... | 280/150 B X |
| 3,549,169 | 12/1970 | Oldberg........................ | 280/150 AB |
| 3,614,128 | 10/1971 | Sobkow ................................. | 180/90 |
| 3,614,129 | 10/1971 | Sobkow ............................ | 180/90 X |
| 3,642,303 | 2/1972 | Irish............................... | 280/150 AB |

FOREIGN PATENTS OR APPLICATIONS
1,023,920  3/1966  Great Britain....................... 180/90

*Primary Examiner*—David Schonberg
*Assistant Examiner*—John P. Silverstrim
*Attorney, Agent, or Firm*—Craig and Antonelli

[57] ABSTRACT

A shock-absorbing front wall for motor vehicles, especially passenger motor vehicles which includes several sections, arranged one above the other, of padded parts projecting into the vehicle interior and permanently deformable by the impact of a vehicle passenger caused by an accident; these sections which are arranged one above the other thereby possess different rigidities and/or thicknesses of the padding layer matched to the impinging body portions; an inflatable gas cushion may also form part of a respective section.

13 Claims, 5 Drawing Figures

SHOCK-ABSORBING FRONT-WALL FOR MOTOR VEHICLES

The present invention relates to a shock-absorbing front wall for motor vehicles, especially passenger motor vehicles, which includes padded parts projecting into the vehicle interior and permanently deformable by an impact of a vehicle passenger caused by an accident.

Shock-absorbing steering wheel constructions are known in the art which are injury-reducing in their effect and which in case of impact accidents against nonyielding obstacles offer to the driver a chance of survival coupled with relatively minor injuries up to predetermined maximum velocities. Exhaustive tests in the field of biomechanics and comparative tests have clearly established the same. However, for the codriver, i.e., the passenger seated alongside the driver, this chance of survival does not exist under the same driving conditions. These results were also determined experimentally as well as by autopsies.

In case of a frontal impact, the body is thrown against the front wall (instrument panel) and the magnitude of the impact forces on the individual body parts of the person in question is differently large depending on the deformation possibility of the construction at the impact place. A survival chance exists only if the impact forces are so matched to one another in a vertical plane that the permissive tolerance limit is not exceeded at any part of the body which might result otherwise in fatal injuries.

Consequently, a shock-absorbing front wall for motor vehicles, especially passenger motor vehicles is proposed, which is provided with padded parts projecting into the vehicle interior and permanently deformable in case of an impact of a vehicle passenger caused by an accident, which according to the present invention includes sections arranged one above the other with differentiated rigidity and/or thickness of the padding layer matched to the impinging body parts.

An optimum differentiation is possible when the individual sections are constituted by different structural elements that are secured at the vehicle independently of one another.

According to a preferred embodiment of the present invention, the individual sections are constituted by deformation members consisting of sheet metal elements which are covered with a padding of varying thickness.

The best possible adaptation to an impinging body is achieved when separate sections are provided for the protection of the head and thorax, on the one hand, and of the legs, on the other.

For the adaptation to the different body parts of differing resistance capabilities which impinge on a deformation member, such a deformation member may be made advantageously of sheet metal parts of different thicknesses.

For the far-reaching dissipation of the impact energy, it may be furthermore of advantage if the connection at the vehicle of the deformation members forming the individual sections takes place by way of deformable elements which absorb energy in the impact direction.

Under certain circumstances, the deformation members may also be made of a plastically deformable synthetic material, such as a deformable synthetic resinous material of known type in lieu of sheet metal.

Moreover, it may be of advantage if separate deformable front wall parts are provided for the driver and the passengers seated alongside the driver.

To further improve the protection afforded by such a shock-absorbing front wall for vehicles, especially for passenger motor vehicles of the type described hereinabove, in order to assure maximum protection for the impinging vehicle passengers in case of an accident, an inflatable gas cushion adapted to be automatically inflated in case of an accident is additionally provided according to the present invention at least at the section of the front wall absorbing the impact of the head and thorax of a vehicle passenger.

With such an arrangement, the kinetic energy is transmitted from body parts impinging on the gas cushion by way of the gas cushion to the front wall and is absorbed by deformation thereof.

According to a particularly advantageous construction of the present invention, the gas cushion—in the inflated condition as viewed in a cross section in the vehicle longitudinal plane—is constructed approximately semicircularly shaped in its lower area and approximately conically shaped in its upper area.

It may be furthermore of advantage with a front wall constructed in accordance with the present invention if a gas cushion is also arranged at the section of the front wall absorbing the impact of the legs of a vehicle passenger.

Preferably, the folded gas cushions in their normal position are so embedded in the padding of the front wall that the surface of these parts are disposed approximately in a common plane.

Finally, according to a further preferred embodiment of the present invention, the surfaces of the gas cushions facing the vehicle passengers may be provided with an elastic protective layer such as, for example, with a padding of foamed material of any known type.

Accordingly, it is an object of the present invention to provide a shock-absorbing front wall for vehicles, especially passenger motor vehicles, which avoids by simple means the aforementioned shortcomings and drawbacks.

Another object of the present invention resides in a front wall construction for vehicles, especially passenger motor vehicles which also offers a chance of survival to the passenger or passengers seated alongside the driver.

A further object of the present invention resides in a shock-absorbing front wall for motor vehicles by means of which fatal injuries are effectively avoided by a proper adaptation of the various sections of the front wall to the tolerance limits permitted for the respective body parts.

Still a further object of the present invention resides in a passenger motor vehicle in which an optimum differentiation of the various sections thereof is made possible.

A further object of the present invention resides in a shock-absorbing front wall for vehicle passengers which utilizes gas cushions for transmitting the forces of the impinging body parts to the front wall sections where these forces are then absorbed by deformation.

These and other objects, features, and advantages of the present invention will become more apparent from the following description when taken in connection with the accompanying drawing, which shows, for purposes of illustration only, two embodiments in accordance with the present invention, and wherein.

Figure 1:
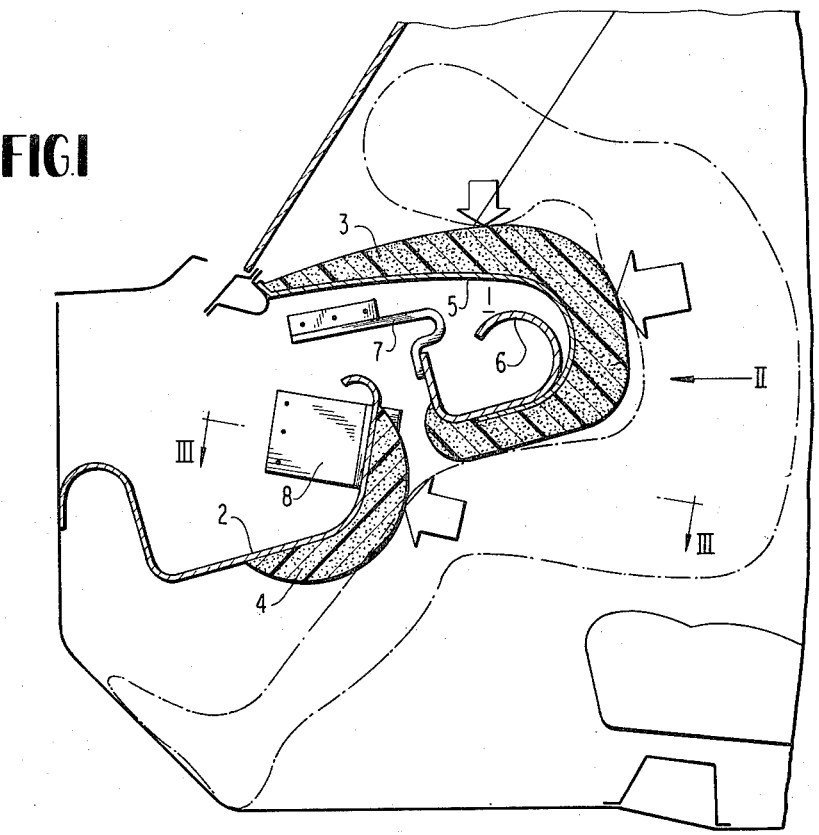
FIG. 1 is a somewhat schematic longitudinal cross-sectional view through a front wall construction of a passenger motor vehicle in accordance with the present invention.
Figure 2:
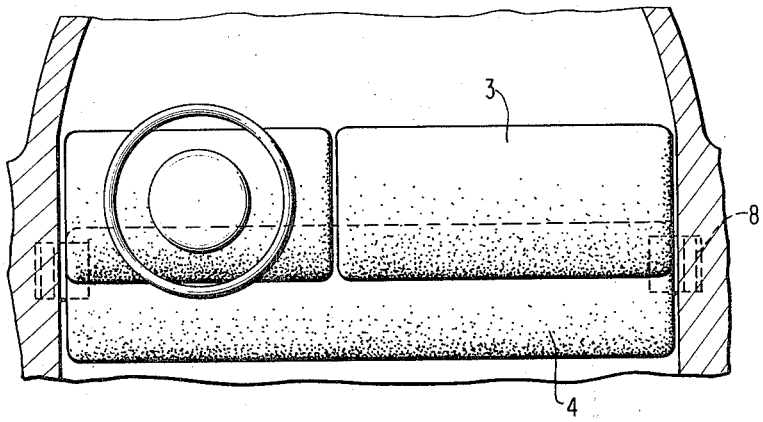
FIG. 2 is an elevational view taken in the direction of arrow II in FIG. 1.

Referring now to the drawing wherein like reference numerals are used throughout the various views to designate like parts, and more particularly to FIG. 1, the directions of the main impact forces of the different body parts of a vehicle passenger indicated in dash and dot lines in case of an impact accident against a fixed obstacle are indicated by the large arrows.

The head and thorax of the vehicle passenger thereby impinge on a first section of a shock-absorbing front wall constituted by a deformation member 1 consisting of sheet metal whereas the legs come into contact with a second section constituted by a deformation member 2. Both deformation members 1 and 2 are covered with a padding 3 and 4 consisting preferably of a foamed material, such as a conventional synthetic resinous foam material, whose varying thickness is to be matched to the resistance of the respective impinging body parts. The same is true also for the rigidity and strength of the different areas of the deformation members 1 and 2 which can be varied by corresponding shaping and selection of the wall thicknesses. Thus, the deformation member 1 consists of two sheet metal members 5 and 6 of different thickness in order to achieve differing rigidities in its different areas.

Figure 3:
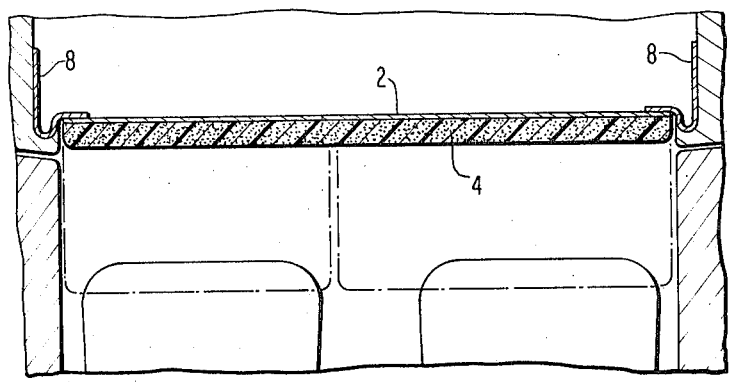
FIG. 3 is a cross-sectional view taken along line III-III of FIG. 1.

The connection of the sides of the deformation members 1 and 2, facing the interior space, at the vehicle takes place by way of deformable elements 7 and 8 (FIG. 3) which are also of the energy absorbing type.

Figure 4:
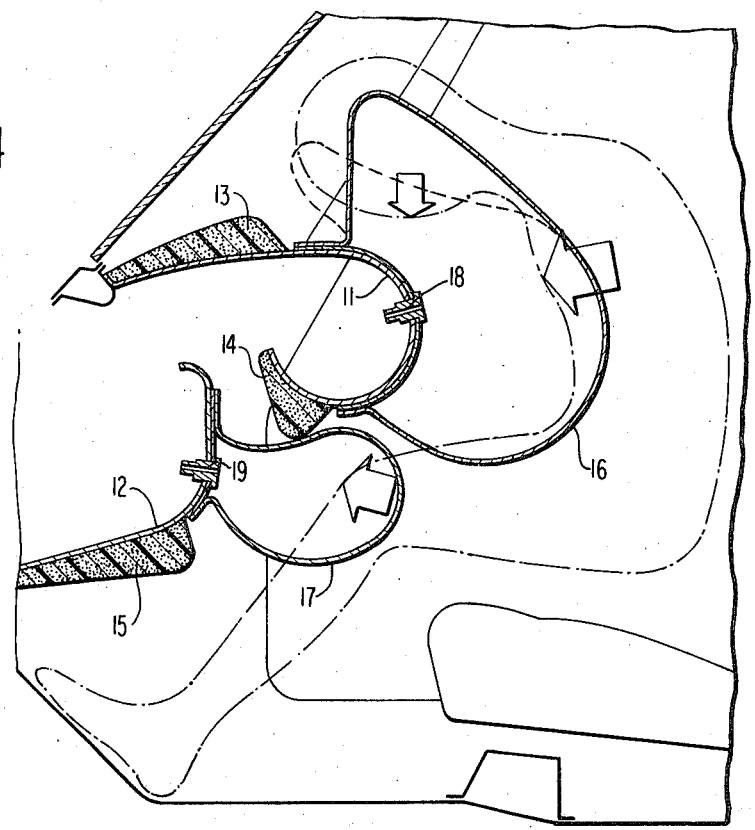
FIG. 4 is a somewhat schematic longitudinal cross-sectional view through a modified embodiment of a front wall construction of a passenger motor vehicle in accordance with the present invention, provided with a gas cushion shown in the inflated condition.

In the embodiment of FIG. 4, the directions of the main impact forces of the different body parts of a vehicle passenger indicated in dash and dot lines during an impact accident against a fixed obstacle are again indicated by the large arrows.

One gas cushion 16 and 17 is thereby arranged at the respective one of the two sections 11 and 12 of the front wall construction shown in this figure which are again provided with padded portions 13, 14 and 15. The gas cushions 16 and 17 are in communication by way of connecting elements 18 and 19, respectively, with a gas source (not shown) of conventional construction.

The gas cushion 16 is thereby so constructed—as can be clearly seen from FIG. 4—that it has an approximately semi-circular shape in its lower area and terminates approximately conically in its upper area. As a result of the upward conical extension of the gas cushion 16, the latter is pressed forwardly during the impact of a head corresponding to the dash line illustrated in FIG. 1 and thus an overload of the neck vertebrae of the impinging vehicle passenger is avoided.

Figure 5:
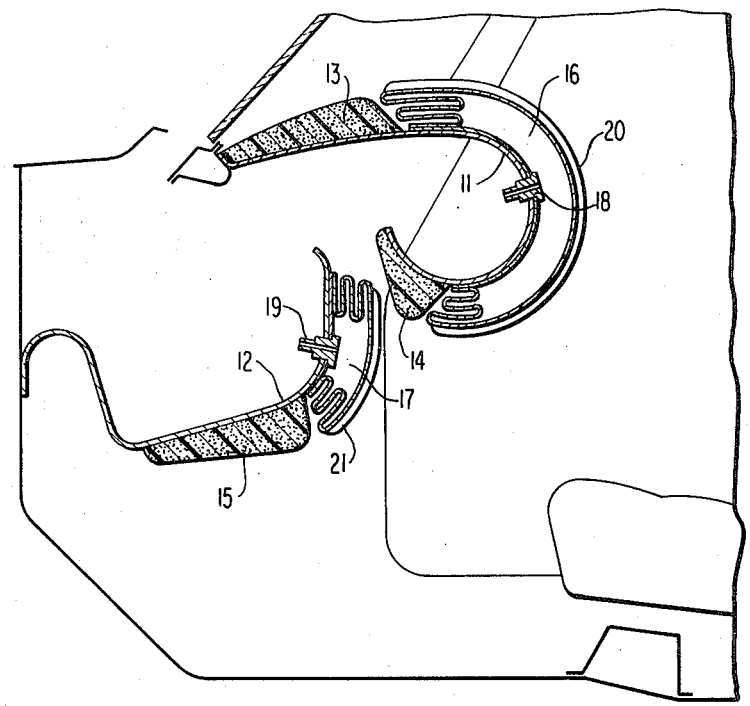
FIG. 5 is a cross-sectional view, similar to FIG. 4, in which the gas cushions are illustrated in their normal folded-together position.

As can be seen from FIG. 5, the gas cushions 16 and 17 are provided at their surface facing the vehicle passengers each with an elastic protective layer 20 and 21, by means of which damaging of the gas cushions 16 and 17 during the operation of the vehicle is prevented.

The filling of the gas cushions 16 and 17 in case of a collision accident can take place in a conventional manner in dependence on a switch responding to the vehicle deceleration by way of a gas source (not shown). The size configuration, and inflating pressure of the gas cushions have to be matched thereby to the pressure tolerance limit and the movement direction of the impinging body parts.

While I have shown and described only two embodiments in accordance with the present invention, it is understood that the invention is not limited thereto but is susceptible of numerous changes and modifications as known to those skilled in the art, and I therefore do not wish to be limited to the details shown and described herein but intend to cover all such changes and modifications as are emcompassed by the scope of the appended claims.

What I claim is:

1. A shock-absorbing front wall for motor vehicles, especially passenger motor vehicles which includes shock-absorbing means that are permanently deformable as a result of an impact of a vehicle passenger caused by an accident, said shock-absorbing means comprising: a first section and a second section independently mounted one above the other, along the front wall of the motor vehicle, said first section including a first deformation member projecting into the vehicle interior, a second deformation member rigidly connected to one end of said first deformation member, one of said deformation members being made from sheet metal of a different thickness, padding means disposed substantially over the entire outer surface of said first and second deformation members, and means for connecting said first and second deformation members with a portion of the vehicle, said second section including an additional deformation member disposed below said first section, padding means provided over a portion of said additional deformation member, and means for connecting said additional deformation member with a portion of the vehicle, said first and second sections possessing different shock-absorbing characteristics matched to the respective body portions impinging thereon.

2. A front wall according to claim 1, wherein said padding means disposed on said first and second sections have differing thicknesses matched to the resistance of respective impinging body parts.

3. A front wall according to claim 2, wherein said first, second and additional deformation members consisting of sheet metal.

4. A front wall according to claim 3, wherein said first section is provided for the protection of the head and thorax, and said second section is provided for the protection of the legs of a vehicle passenger.

5. A front wall according to claim 3, wherein said padding means consists of a plastically deformable synthetic material.

6. A front wall according to claim 3, wherein separate deformable first sections are provided for the driver and the person seated alongside the driver.

7. A front wall according to claim 2, wherein said means for connecting said first and second deformation members and said additional deformation member to a portion of the vehicle includes deformable means absorbing energy in the impact direction.

8. A front wall according to claim 1, wherein said first deformation member consists of a substantially U-shaped member, said second deformation member being rigidly connected to one leg of said U-shaped member.

9. A front wall according to claim 8, wherein said second deformation member includes a first substantially D-shaped portion, a second portion extending substantially parallel to one leg of said substantially U-shaped member and a third angular bent portion disposed opposite said C-shaped portion.

10. A front wall according to claim 9, wherein said means for connecting said first and second deformation members with a portion of the vehicle includes deformable means for absorbing energy in the impact direction disposed between said angularly bent portion and the portion of the vehicle.

11. A front wall according to claim 10, wherein said padding means disposed on said first and second sections have differing thicknesses matched to the resistance of respective impinging body parts.

12. A front wall according to claim 8, wherein said first, second and additional deformation members consist of sheet metal and at least one of said deformation members is made from sheet metal of a different thickness.

13. A front wall according to claim 12, wherein said second deformation member is made from sheet metal of a different thickness.

* * * * *